| United States Patent [19] | [11] 3,806,579 |
| Carles et al. | [45] Apr. 23, 1974 |

[54] METHOD OF PURIFICATION OF URANIUM HEXAFLUORIDE

[75] Inventors: Maurice Carles; Jacky Fra, both of Pierrelatte, France

[73] Assignee: Commissariat A L'Energie Atomique, Paris, France

[22] Filed: Mar. 22, 1971

[21] Appl. No.: 126,682

[30] Foreign Application Priority Data
Apr. 8, 1970 France .............................. 70.12685

[52] U.S. Cl.......................... 423/19, 423/8, 423/258
[51] Int. Cl................................................ C01g 43/06
[58] Field of Search........ 23/326, 339, 352; 423/19, 423/258, 8

[56] References Cited
UNITED STATES PATENTS

| 2,830,873 | 4/1958 | Katz et al............................. 23/326 |
| 3,425,812 | 2/1969 | Cousin et al........................... 23/352 |
| 3,359,078 | 12/1967 | Alter et al............................. 23/326 |
| 3,340,019 | 9/1967 | Pierini et al. ......................... 23/326 |

Primary Examiner—Carl D. Quarforth
Assistant Examiner—F. M. Gittes
Attorney, Agent, or Firm—Cameron, Kerkam & Sutton

[57] ABSTRACT

This invention relates to a method of purification of uranium hexafluoride contaminated with impurities such as molybdenum hexafluoride and tungsten hexafluoride.

The contaminated uranium hexafluoride is distilled from the liquid phase in the presence of chlorine trifluoride which forms an azeotrope with the impurities to be removed from the uranium hexafluoride, said impurities are withdrawn from the top of the column and the purified uranium hexafluoride is collected at the bottom of the column.

1 Claim, 4 Drawing Figures

METHOD OF PURIFICATION OF URANIUM HEXAFLUORIDE

This invention relates to a method of purification of uranium in the form of uranium hexafluoride which contains impurities such as molybdenum and tungsten.

Uranium hexafluoride is prepared by the action of fluorine on uranium tetrafluoride, this compound being in turn obtained as a result of the action of anhydrous hydrofluoric acid on uranium dioxide. The product thus obtained contains impurities ($MoF_6$, $WF_6$, etc.) which have to be eliminated especially for subsequent use in enrichment plants.

The methods of purification of uranium hexafluoride involve either distillation or solvent extraction.

The first method of purification consists in direct distillation of the gaseous mixture of uranium hexafluoride and molybdenum hexafluoride or of the mixture of uranium hexafluoride and tungsten hexafluoride.

Uranium hexafluoride is withdrawn in the pure state at the bottom of the column. Molybdenum hexafluoride and tungsten hexafluoride pass out at the top of the column in the form of a mixture which is rich in uranium hexafluoride (approximately 95 percent).

The second method consists in converting uranium hexafluoride into uranyl nitrate and then in extracting the uranium by tributylphosphate. The impurities remains in the aqueous phase.

Taking into account the low relative volatility of molybdenum hexafluoride and tungsten hexafluoride with respect to uranium hexafluoride, a column having a large number of plates must be employed for the distillation process in order to permit the separation of uranium hexafluoride from its impurities.

Two types of separation are possible:
- either it is sought to obtain 100 percent molybdenum hexafluoride of tungsten hexafluoride at the top of the column and 100 percent uranium hexafluoride at the bottom of the column,
- or it is desired to obtain uranium hexafluoride in the pure state at the bottom of the column while limiting the quantity obtained at the top of the column to a few per cent of molybdenum hexafluoride or tungsten hexafluoride.

In the first case, provision must be made for a distillation column having a large number of plates in order to carry out the separation process. It is necessary to introduce molybdenum hexafluoride or tungsten hexafluoride in order to set the column at its steady state unless the progressive accumulation of impurities at the top of the column is first permitted to take place.

In the second case, the uranium hexafluoride which leaves the top of the column together with the impurities must be recovered. Control of the installation is difficult to achieve since the concentration curve in the column is known only on the basis of analyses, taking into account the very small temperature difference between the top and the bottom of the column (the bottom of the column is at the boiling temperature of $UF_6$ at the pressure under consideration whilst the top of the column is at a temperature which is close to the boiling point of $UF_6$, the gases which leave the top of the column being essentially constituted by $UF_6$).

The method of purification of uranium hexafluoride by chemical separation takes a long time to carry into effect. It involves formation of a precipitate of ammonium diuranate by bubbling of uranium hexafluoride through ammonia, dissolving the ammonium diuranate which is formed with nitric acid, extraction of the uranyl nitrate by tributylphosphate whilst the impurities remain in the aqueous phase, stripping of the uranium with a nitric acid solution, action of ammonia on the uranyl nitrate so as to yield ammonium diuranate, calcination of the ammonium diuranate in order to form $UO_3$, reduction of $UO_3$ to $UO_2$ by hydrogen, conversion of $UO_2$ into $UF_4$ by anhydrous hydrofluoric acid and conversion of $UF_4$ into $UF_6$ by fluorine. This process involves a large number of stages and calls for substantial quantities of pure reagents.

The method of purification of uranium hexafluoride in accordance with the invention essentially consists in distilling uranium hexafluoride in the presence of chlorine trifluoride so as to form an azeotropic mixture with the impurities which are to be removed from the uranium hexafluoride, said impurities being discharged at the top of the column and the purified uranium hexafluoride being collected at the bottom of the column.

The method is applicable to the removal of any impurity contained in uranium hexafluoride which forms an azeotropic mixture with chlorine trifluoride provided that both miscibility and chemical compatibility exist.

The mixture of uranium hexafluoride and chlorine trifluoride is wholly miscible over the entire concentration range provided that the total pressure remains higher than approximately 2,500 mb. Below this value, the liquid-vapor equilibrium region encounters a zone in which two phases are present, one phase being a chlorine trifluoride solution which is saturated with uranium hexafluoride and the other phase being uranium hexafluoride crystals, with the result that the distillation process cannot proceed further.

The phase equilibrium diagram of the molybdenum hexafluoride-chlorine trifluoride mixture is shown in FIG. 1. The diagram demonstrates the existence of an azeotrope which, at a pressure of 3,450 mb, contains 12 percent molybdenum hexafluoride (boiling point: 44.2°C).

The gas to be purified and the chlorine trifluoride are introduced at an intermediate point G of the distillation column which contains a packing. However, it is possible to introduce the chlorine trifluoride into the column independently of the gas to be purified.

The column is provided at the base with a reboiler R and an overhead condenser C which returns the $UF_6$ as reflux. Purified $UF_6$ is withdrawn from the bottom of the column whilst the chlorine trifluoride and the impurities are withdrawn from the top of the column.

The substantial temperature difference between the top and bottom of the column permits easy separation of impurities from the uranium hexafluoride. As can be seen from FIG. 3, said difference is of the order of 50°C: the temperature at the bottom of the column corresponds to the boiling temperature of $UF_6$ at the pressure under consideration (3,450 mb) and the temperature at the top of the column corresponds to the boiling temperature of the azeotrope. The concentrations along the column are perfectly defined, thus avoiding the need for continuous analytical testing of the purity of the bottom product (pure $UF_6$).

The chlorine trifluoride at the top of the column can be regenerated either periodically or on a continuous basis.

Depending on the quantities of chlorine trifluoride which are consumed, it is possible to recover this latter:

either partly, by aeotropic distillation $ClF_3$ — azeotrope $ClF_3/MoF_6$ or $ClF_3$ azeotrope $ClF_3/WF_6$, or totally by trapping molybdenum hexafluoride or tungsten hexafluoride on sodium fluoride. The chlorine trifluoride which is inactive on this product is recycled.

The method has been carried into effect in a column which had the following characteristics:
construction entirely of monel,
packing: five sections consisting of two sections of 1.683 m and three sections of 0.678 m,
springs having contiguous turns wound so as to have a rectangular cross-section of 5 mm,
column diameter: 70 mm,
heat balance: 2,250 watts.

Known quantities of $MoF_6$ and $WF_6$ were introduced and the concentrations of these products along the column was then measured. The quantities employed were:

in the case of chlorine trifluoride: 2.4 kg of liquid chlorine trifluoride in the packing;
in the case of uranium hexafluoride: 0.8 kg of liquid uranium hexafluoride in the packing.

Figure 1:
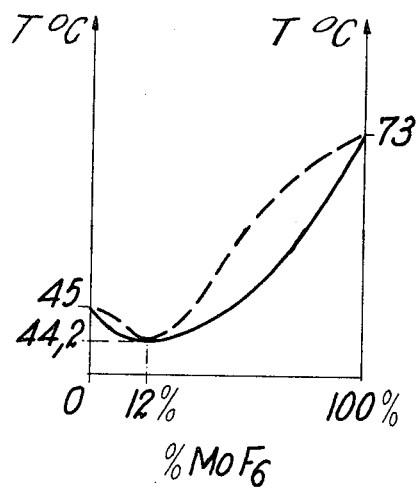
Figure 2:
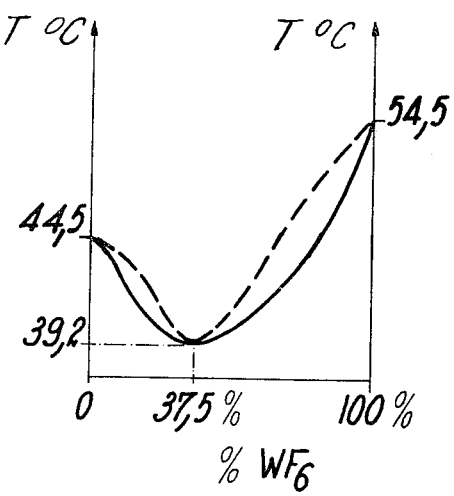
FIG. 2 shows the phase equilibrium diagram of the tungsten hexafluoride-chlorine trifluoride mixture. This diagram demonstrates the existence of an azeotrope which, at a pressure of 3,450 mb, contains 37.5 percent tungsten hexafluoride (boiling point: 39.2° C).
Figure 3:
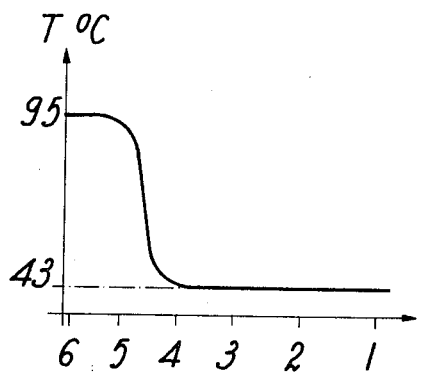
FIG. 3 shows the curve of temperatures along the distillation column in equilibrium with the mixture of $UF_6$ and $ClF_3$.

The curve of temperatures along the column is shown in FIG. 3. Practically quantitative separation of $UF_6$ from $ClF_3$ is achieved as is established by analysis ($UF_6$ at the top of the column: less than 30 vpm; $ClF_3$ at the bottom of the column: less than 50 vpm).

Figure 4:
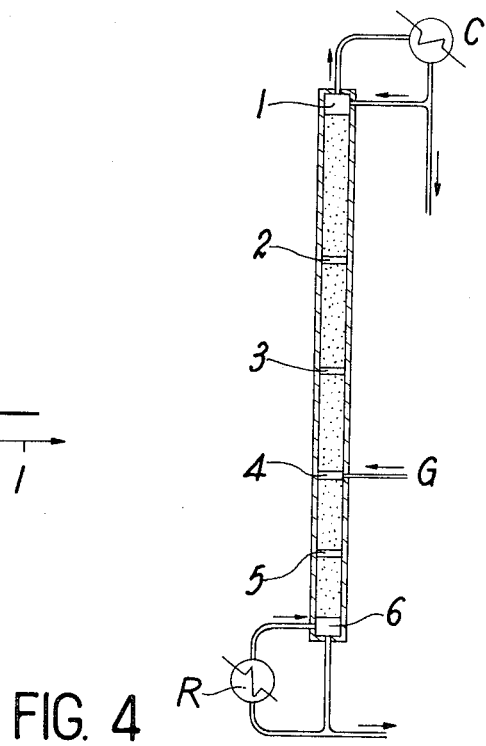
FIG. 4 is a diagrammatic view of the distillation column which is employed for carrying out the method.

The quantities of $MoF_6$ were introduced successively and in cumulative values as follows:
5 g, 10 g, 14 g, 20 g, 40 g, 100 g, 220 g, 450 g, After each introduction, the curve of concentrations of this product along the column from the top of this latter (FIG. 4) was determined analytically.

The results obtained were grouped together in Table I. These results show the efficiency of the method for the separation of molybdenum hexafluoride with a small number of plates.

Since the relative volatility of tungsten hexafluoride with respect to chlorine trifluoride is greater than in the case of molybdenum hexafluoride, it was possible to carry out tests more rapidly with tungsten hexafluoride. After introduction of 656 g of tungsten hexafluoride, the concentrations of this product were:

at the top of the column (point 1): 10 620 vpm (point 2): < 0.465 vpm

There is therefore found to be a drop from 10 620 vpm to less than 0.465 vpm with 1.683 m of a packing of the "heli-pak" type.

In order to ensure that the tungsten hexafluoride and molybdenum hexafluoride did not have any mutual influence, ($WF_6$ and $MoF_6$) were introduced simultaneously. The results were practically identical with those obtained in the case of each of the products introduced separately.

TABLE I

| Quantity of $MoF_6$ | Concentration of $MoF_6$ in vpm | | | | | |
|---|---|---|---|---|---|---|
| | Sample test 1 | 2 | 3 | 4 | 5 | 6 |
| 5 | 154 | < 0.88 | < 0.88 | | | |
| 10 | 220 | 3.5 | < 0.88 | | | |
| 14 | 321 | 1.5 | <0.88 | Values below the | | |
| 20 | 431 | — | < 1.33 | limits of | | |
| 40 | 802 | 3.5 | < 0.88 | analytical | | |
| 100 | 1898 | 3.08 | <1.32 | sensitivity | | |
| 220 | 4317 | 12.95 | < 1.23 | | | |
| 450 | 8240 | 21.13 | < 0.88 | | | |

What we claim is:

1. A method of purification of uranium hexafluoride contaminated with the impurities molybdenum hexafluoride and tungsten hexafluoride in a distillation column comprising the steps of maintaining the column under a pressure of about 3,450 mb, at a temperature of 43°C. at the bottom of the column and at a temperature of about 95°C. at the top of the column, distilling contaminated uranium hexafluoride with chlorine trifluoride which forms an azeotrope with the impurities to be removed from the uranium hexafluoride, withdrawing said impurities from the top of the column and collecting the purified uranium hexafluoride at the bottom of the column.

* * * * *